United States Patent
Chan et al.

[15] 3,646,436
[45] Feb. 29, 1972

[54] APPARATUS AND METHOD FOR MEASURING ELECTRICAL RESISTANCE EMPLOYING CONSTANT OUTPUT VOLTAGE TECHNIQUE

[72] Inventors: Joseph Y. Chan, Chelmsford; Dinesh C. Gupta, Cambridge, both of Mass.

[73] Assignee: GTE Laboratories Incorporated

[22] Filed: Dec. 22, 1969

[21] Appl. No.: 886,974

[52] U.S. Cl. .................................324/64, 323/22, 324/62 R
[51] Int. Cl. ...................................................G01r 27/14
[58] Field of Search ..............324/62, 64, 65; 323/1, 9, 22 T

[56] References Cited

UNITED STATES PATENTS 2,735,754   2/1956   Dravnieks.............................324/64 X
2,854,626   9/1958   Davidson et al. ......................324/64
3,312,893   4/1967   Currin et al............................324/64

*Primary Examiner*—Edward E. Kubasiewicz
*Attorney*—Irving M. Kriegsman

[57] ABSTRACT

Technique of measuring resistivity of a specimen by contacting the specimen with a pair of electrodes and passing a constant current from a constant current source through the specimen between the electrodes. The potential drop between the electrodes is detected and employed to control the output of the constant current source so as to produce a potential drop between the electrodes of a predetermined value. The measured constant current from the source which produces the predetermined potential drop is a measure of the resistivity of the specimen between the pair of electrodes.

4 Claims, 4 Drawing Figures

INVENTORS
JOSEPH Y. CHAN
DINESH C. GUPTA

BY David M. Keay

AGENT

APPARATUS AND METHOD FOR MEASURING ELECTRICAL RESISTANCE EMPLOYING CONSTANT OUTPUT VOLTAGE TECHNIQUE

BACKGROUND OF THE INVENTION

This invention relates to apparatus and methods for measuring electrical resistance. More particularly, it is concerned with apparatus and methods for measuring the electrical resistivity of semiconductor materials.

Various techniques have been developed for measuring the resistivity of semiconductor materials. One technique which is nondestructive and useful over a wide range of resistivities is the spreading resistance probe technique. In this technique as commonly employed a specimen of semiconductor material is contacted by two probes or electrodes. A constant current is passed through the specimen between the electrodes and the voltage drop is measured. From this measurement the resistivity of the region of the specimen adjacent the probes may be determined.

Various factors influence the accuracy to which resistivity can be determined by the aforementioned technique. Certain of these factors involve the mechanical aspects of making contact between the electrodes and the specimen and are discussed in detail in application Ser. No. 886,908, filed concurrently herewith by Joseph Y. Chan and Dinesh C. Gupta, entitled "Apparatus for Measuring Electrical Characteristics of a Specimen" and assigned to the assignee of the present invention. In addition, measurements are affected by temperature changes at the regions of contact and within the specimen due to Joule heating caused by the flow of test current.

SUMMARY OF THE INVENTION

In measuring the electrical resistance of a specimen in accordance with the present invention the specimen is contacted by a pair of electrodes. A constant current is passed through the specimen between the electrodes from a source of constant current connected to the electrodes. A control means is connected to the electrodes and to the source of constant current for changing the values of the constant current to obtain a predetermined potential drop between the electrodes. When the potential drop between the electrodes is equal to the predetermined potential drop, a current-measuring means measures the current flowing from the source of constant current. The measured constant current which produces the predetermined potential drop is a measure of the resistivity of the specimen between the pair of electrodes.

BRIEF DESCRIPTION OF THE DRAWINGS

Additional objects, features, and advantages, of the apparatus and method for measuring resistance in accordance with the invention will be apparent from the following detailed discussion together with the accompanying drawings wherein.

DESCRIPTION OF THE INVENTION

Figure 1:
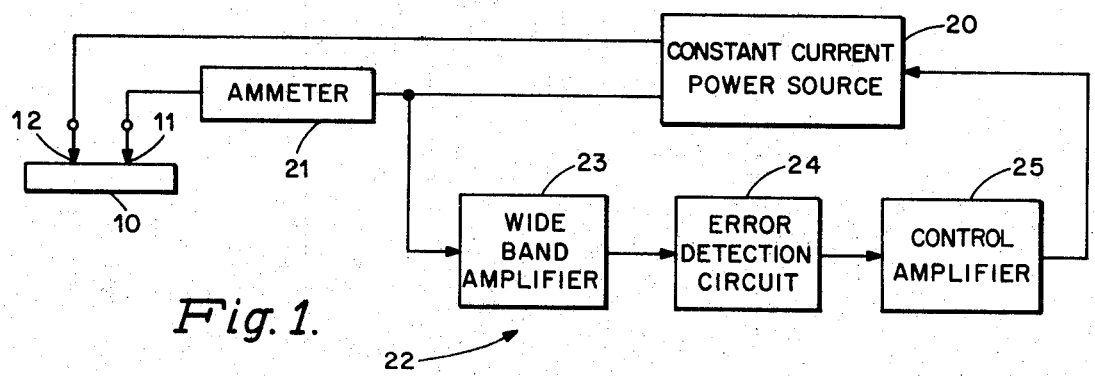
FIG. 1 is a block diagram of apparatus in accordance with the invention.
Figure 2:
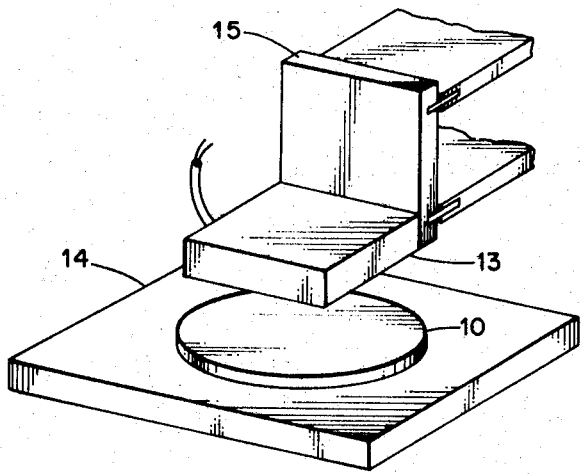
FIG. 2 is a perspective view illustrating certain elements of the apparatus of the invention.
Figure 2A:
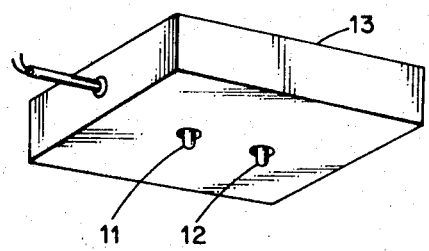
FIG. 2A is a detailed view in perspective of a portion of the apparatus illustrated in FIG. 2.

FIG. 1 is a schematic representation in block diagram form of apparatus in accordance with the invention for measuring the resistivity of a specimen 10. The apparatus includes two probes or electrodes 11 and 12 which are mounted at a fixed distance from each other in a measuring head 13 as illustrated in FIGS. 2 and 2A. As shown in FIG. 2 the specimen 10 is placed on a support 14 beneath the measuring head 13. The measuring head is fixed to a mounting structure 15 which is appropriately raised and lowered (by means not shown) to bring the electrodes into contact with the specimen. An improved apparatus for raising and lowering the measuring head is disclosed in detail in the aforementioned application filed concurrently herewith entitled "Apparatus for Measuring Electrical Characteristics of a Specimen."

As illustrated in the block diagram of FIG. 1 the electrodes are connected to a constant current power source 20. One of the electrodes 11 is connected through an ammeter 21 and the second electrode 12 is connected directly to the source 20. The first electrode 11 is also connected, at a point between the ammeter 21 and the constant current source 20, to a control arrangement 22 which controls the output current of the constant current power source 20. The control arrangement includes a wide band amplifier 23, an error detection circuit 24, and a control amplifier 25.

The apparatus as illustrated in FIG. 1 operates generally in the following manner. The electrodes 11 and 12 are brought into contact with the specimen 10. Current from the constant current power source 20 flows to the electrodes and through the specimen 10 between the tips of the electrodes. The wide band amplifier 23 senses the potential on the first electrode 11. (The second electrode 12 is connected directly to ground within the constant current power source.)

The detected potential level is amplified by the wide band amplifier 23 and applied to the error detection circuit 24. The error detection circuit 24 produces an output signal which is indicative of the difference between the level of the applied signal from the wide band amplifier 23 and a predetermined voltage level. The output signal is applied to the control amplifier 25 which changes the input signal to the constant current power source 20. The change in the input signal to the constant current power source 20 causes a change in the value of the output current of the constant current power source 20 which in turn changes the potential drop between the electrodes, as detected by the control arrangement 22, to a predetermined value.

When the detected potential is at the desired value, the error detection circuit 24 detects no difference between its input voltage level and the predetermined voltage level. Thus, the operation of the control amplifier 25 and consequently the operation of the constant current power source 20 are stabilized. The ammeter 21 may then be read to determine the value of constant current from the source 20 passing through the electrodes and the portion of the specimen between the electrodes. The ammeter reading is a measure of the resistivity of the region of the specimen adjacent the electrodes.

In a specific embodiment of the apparatus according to the invention electrodes 11 and 12 of tungsten carbide, each having a tip radius of 0.0016 inch, were mounted in a measuring head 13 as shown in FIGS. 2 and 2A so as to produce a constant force of contact of about 15 grams on a specimen. The distance between the electrode tips was 0.150 inch. The second of the electrodes 12 was connected directly to the constant current power source 20. The constant current power source 20 was a Model C612A constant current power supply produced by Electronic Measurements Co. Inc., Eaton-town, N.J.

Figure 3:
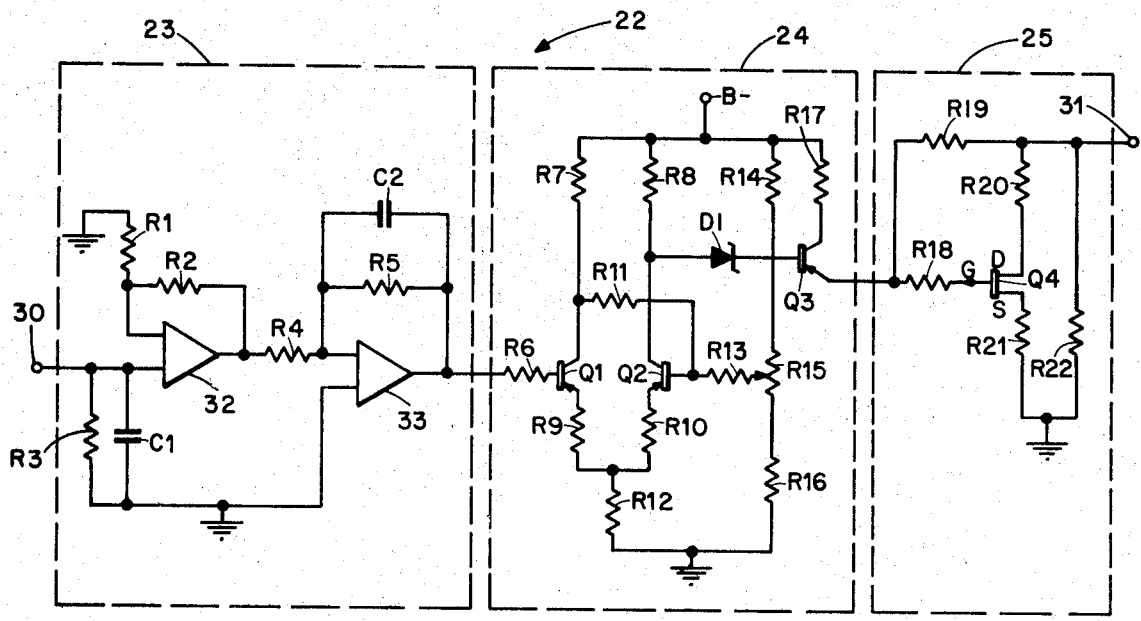
FIG. 3 is a detailed circuit schematic diagram of portions of the apparatus shown in the block diagram of FIG. 1.

The first electrode 11 was connected through an ammeter 21 to the positive terminal of the power supply 20. The second electrode 12 was connected to ground and directly to the negative terminal of the power supply 20. The positive terminal of the power supply was also connected to the input terminal 30 of the wide band amplifier 23 as illustrated in FIG. 3. The output terminal 31 of the control amplifier 25 illustrated in FIG. 3 was connected directly to the remote terminal of the power supply.

The wide band amplifier 23 was a cascaded arrangement of two operational amplifiers 32 and 33, specifically Model 105 operational amplifiers produced by Analog Devices Inc., Cambridge, Mass., together with appropriate biasing circuitry. The wide band amplifier 23 amplified the voltage signal applied at the input terminal by 1000.

The output signal from the wide band amplifier 23 was applied to the base of a transistor Q1 of a transistor pair Q1 and Q2 forming a differential amplifier in the error detection circuit 24. The output of the differential amplifier was passed through an emitter-follower transistor Q3 to the control amplifier 25.

The control amplifier 25 included a series arrangement of a field effect type transistor Q4 and two resistors R20 and R21. A resistor R22 of high resistance value was connected in parallel with the series arrangement and between the remote terminal of the power supply and ground. Error signals from the error detection circuit 24 applied to the gate of the field effect transistor Q4 changed the impedance of the field effect transistor Q4 and, therefore, the current flowing therethrough. The constant current power source 20 employed differential amplifier circuitry and the value of the constant output current from the constant current power source was regulated by the conditions produced at its input by the control amplifier 25.

For the specific embodiment described above, 4 millivolts was selected as the value of the predetermined potential drop between the electrodes. This value was found to be particularly advantageous for use in measuring semiconductor materials within the range of resistivities from $10^{-3}$ to $10^3$ ohm-centimeters. The constant current power source 20 was capable of providing a constant current output from 1 microampere to 100 milliamperes.

The values of the components in the control arrangement 22 of the specific embodiment including the wide band amplifier 23, the error detection circuit 24, and the control amplifier 25 are listed below.

| | |
|---|---|
| Q1 PNP transistor 2N800 | R11 470 ohms |
| Q2 PNP transistor 2N800 | R12 750 ohms |
| Q3 PNP transistor 2N800 | R13 820 ohms |
| Q4 N channel field—effect transistor —Texas Instrument type S34 | R14 10 kilohms |
| D1 1N2069 | R15 200 ohms potentiometer |
| R1 330 ohms | R16 500 ohms |
| R2 10 kilohms | R17 4700 ohms |
| R3 1 kilohm | R18 220 kilohms |
| R4 1 kilohm | R19 4700 ohms |
| R5 32.4 kilohms | R20 100 ohms |
| R6 820 ohms | R21 1 kilohm |
| R7 1500 ohms | R22 megohms |
| R8 1500 ohms | C1 25 microfarads |
| R9 330 ohms | C2 3.3 microfarads |
| R 10 330 ohms | B- -15 volts |

In practicing the invention as described for measuring electrical resistance, the potential drop between the electrodes is the same for each measurement. That is, the IR drop does not vary from specimen to specimen or from measurement to measurement. In addition, the Joule heating decreases for higher values of resistance. By the choice of a suitable value of potential drop (4 millivolts in the specific embodiment disclosed) the IR drop will always be low. Since these conditions are the same for each measurement, a high degree of reproducibility and accuracy of measured resistivities is obtained.

While there has been shown and described what is considered a preferred embodiment of the present invention, it will be obvious to those skilled in the art that various changes and modifications may be made therein without departing from the invention as defined by the appended claims.

What is claimed is:

1. Apparatus for measuring the electrical resistance of a specimen comprising
   a pair of electrodes for contacting the specimen;
   a source of constant current connected to the pair of electrodes;
   control means including
      sensing means connected to the electrodes for detecting the potential drop therebetween,
      comparison means connected to the sensing means and operable to produce an output signal indicative of the difference between a predetermined potential and the detected potential drop between the electrodes, and
      regulating means connected to the comparison means and to said source of constant current and operable in response to the output signal from the comparison means to vary the value of the constant current produced by the source of constant current in a manner to change the value of the potential drop between the electrodes toward the predetermined potential; and
   current-measuring means for measuring the current flow from the source of constant current when the potential drop between the electrodes equals said predetermined potential.

2. Apparatus for measuring the electrical resistance of a specimen in accordance with claim 1 wherein
   the value of the constant current produced by the source of constant current varies in response to the impedance present at the input thereto;
   said regulating means includes a variable impedance element connected to the input of the source of constant current; and
   the value of the impedance of said variable impedance element varies in response to the output signal from the comparison means.

3. Apparatus for measuring the electrical resistance of a specimen in accordance with claim 2 wherein
   said comparison means includes a differential amplifier circuit and is operable to produce an output signal proportional to the difference between said predetermined potential and the detected potential drop between the electrodes; and
   said variable impedance element is a field-effect type transistor having its gate connected to said comparison means and its source and drain coupled to the input of the source of constant current and is operable to provide a value of impedance between the source and drain related to the output signal from the comparison means.

4. The method of measuring the electrical resistance of a specimen including the steps of
   contacting the specimen with a pair of electrodes;
   passing a constant electrical current through the specimen between the electrodes;
   measuring the potential drop between the electrodes;
   comparing the measured potential drop between the electrodes with a predetermined potential;
   changing the value of the constant current to change the potential drop between the electrodes to the predetermined potential; and
   measuring the electrical current when the potential drop between the electrodes equals said predetermined potential.

* * * * *